United States Patent

[11] 3,576,450

[72] Inventor Chauncey R. Davies
Middletown, N.J.

[21] Appl. No. 721,908
[22] Filed Jan. 22, 1968
Division of Ser. No. 459,396, May 27, 1965.
[45] Patented Apr. 27, 1971
[73] Assignee Bell Telephone Laboratories, Incorporated
New York, N.Y.

[54] SYSTEM FOR REMOTE TESTING OF TELEPHONE SUBSCRIBERS LINES
5 Claims, 1 Drawing Fig.

[52] U.S. Cl. .......... 307/243, 307/258, 307/287, 307/324
[51] Int. Cl. .......... H03k 17/56
[50] Field of Search .......... 307/287, 324, 258, 243

[56] References Cited

UNITED STATES PATENTS

| | | | |
|---|---|---|---|
| RE24,303 | 4/1957 | Wood | 307/287 |
| 2,855,524 | 10/1958 | Shockley | 307/258 |
| 3,015,755 | 1/1962 | Wright | 307/287 |
| 3,133,204 | 5/1964 | Winchel | 307/258 |
| 3,177,036 | 2/1965 | Sokoler | 307/287 |
| 3,382,371 | 5/1968 | Feldman | 307/258 |

*Primary Examiner*—Donald D. Forrer
*Assistant Examiner*—Harold A. Dixson
*Attorneys*—R. J. Guenther and William L. Keefauver

ABSTRACT: In a system for remote testing of telephone subscribers' lines as disclosed in U.S. Pat. No. 3,410,966, a lockout selector device is provided which selects one control signal at random from a plurality of possible control signals. The lockout selector device locks out all other control signals while the selected control signal is transmitted for a prescribed duration, and then proceeds to select the remaining control signals at random, one at a time, for similar transmission. Specifically, an array of PNPN junction diodes is connected through a common load impedance to a common voltage supply. The other terminals of these diodes are selectively grounded by requests for signals.

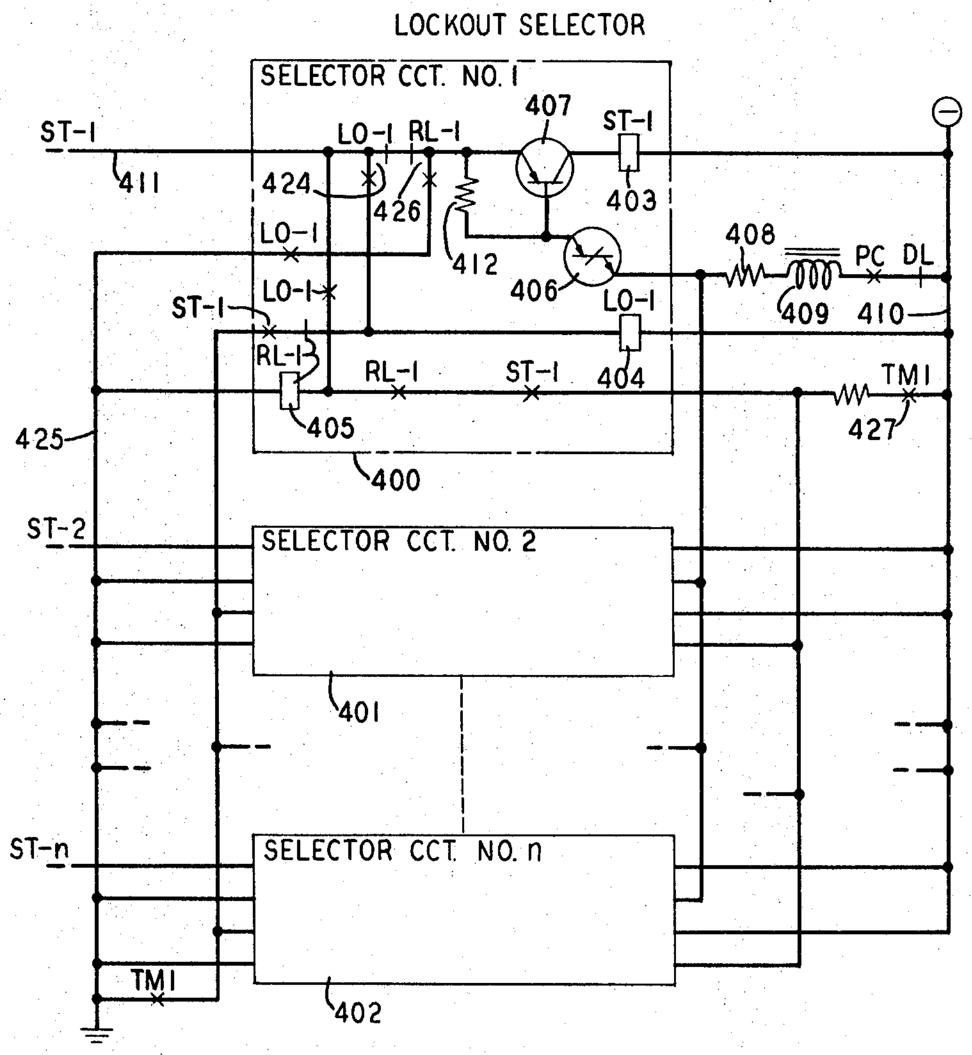
LOCKOUT SELECTOR
SELECTOR CCT. NO. 1
407
ST-1
LO-1
RL-1
411
424
426
403
412
406
408
409
PC
DL
410
LO-1
404
RL-1
405
TM1
427
425
400
ST-2
SELECTOR CCT. NO. 2
401
ST-n
SELECTOR CCT. NO. n
402
TM1

SYSTEM FOR REMOTE TESTING OF TELEPHONE SUBSCRIBERS LINES

This is a division of application Ser. No. 459,396, filed May 27, 1965.

This invention relates to telephone testing systems and, more particularly, to the testing of local subscriber loops from remote testing centers.

The maintenance of a modern telephone system requires regular periodic testing of subscribers' lines to insure that customers receive continuous service of good quality. Since a large proportion of local subscriber loops are exposed to weathering, storm damage and vandalism, circuit continuity is often impaired by short circuits, grounding, line crosses and other troubles. These trouble conditions must be detected soon after their occurrence and located so that repairs can be made.

The basic testing of local subscriber loops is accomplished by applying test voltages to the loop conductors and observing the behavior of the current through the loop. Tests of the various functions of the local central office are also possible, as well as special tests for multiparty loops, pay station loops, ringing circuits, and so forth. The results of these tests can be read on a direct current meter connected to the loop.

Heretofore, a Local Test Desk (LTD) has been provided to perform all of the above tests as well as set up the necessary connections. Due to the necessity of providing direct current meter readings for most of these tests, the range over which these tests can be performed is severely limited. Direct current paths must be maintained to the local subscriber loops from the LTD. Moreover, the impedance of these direct current paths must be kept at a very small value to prevent undesired influences on the test readings. As a result, separate LTD's must be provided for each small geographical area, along with all of the attendant control and supervisory equipment. It is necessary, for example, to provide a number of test desks in a single large city where economics would normally dictate centralization of the test functions.

It is a general object of the present invention to extend the range of test facilities for testing local subscriber loops to theoretically unlimited geographical distances.

In order to extend the range of heretofore proposed subscriber loop test facilities, it is the practice to dedicate a number of interexchange test trunks for this purpose and to connect these trunks in parallel. This procedure does lower the resistance of the test facilities to acceptable ranges for smaller distances, but causes a corresponding increase in the capacity of the test facilities, thus making ballistic types of tests difficult or impossible. More importantly, the dedication of large numbers of interexchange trunks solely for subscriber loop testing greatly increases the cost of such testing facilities.

It is a further object of the invention to test local subscriber loops over nondedicated trunking facilities in the commercial telephone network.

In accordance with the present invention, these general objects are achieved by the use of alternating current signaling between a test desk and a local exchange which may be as far from the test desk as desired. The local test conditions, such as test batteries, grounds and reversals, are provided for by remotely controlled test facilities which may be identical in most respects to those previously used. The control of these test facilities, however, is achieved by the use of a system of alternating current signals transmitted from the test desk location to the remote location where they are detected and used to control the local test facilities. In a similar fashion, the direct current test readings at the local exchange are transformed into alternating current signals and transmitted back to the test desk to be detected and used to operate a meter.

From the above description, it can be seen that the local test desk facilities for the system of the present invention can be maintained exactly as they have been for previously used systems. These facilities include a dial, a head set, a direct current meter and a number of control keys to set up the desired tests. The present invention comprises a signaling system which utilizes the direct current outputs of these facilities to generate the required alternating current signals. Similarly, the direct current in the local subscriber loop is used to generate an alternating current signal on which the direct current signal is modulated. In the preferred embodiment, pulses of multifrequency tones are used for control signaling while frequency modulation is used for transmitting the direct current readings.

In a signaling system such as is required in the present invention, each multifrequency signal requires a minimum duration in order to be received accurately at the remote exchange. It is desirable, however, that the testman not be restricted to operating the control keys at any prescribed rate.

It is a more specific object of the present invention to successively generate a plurality of signals, each for a predetermined length of time, and selected randomly from a plurality of requests for such signals.

In accordance with this aspect of the present invention, a lockout selector is provided which selects one control signal at random from a plurality of possible control signals, transmits that control signal for a predetermined duration, meanwhile locking out all other control signals, and then proceeds to select the remaining control signals at random, one at a time, for similar transmission. Specifically, an array of PNPN junction diodes are connected through a common impedance to a common voltage supply. The other terminals of these diodes are selectively grounded by requests for signals, i.e., by the operation of the supervisory control keys.

Such diodes have a dynamic negative resistance region between a stable low conduction state and a stable high conduction state. If a plurality of these diodes are simultaneously grounded, the first to achieve a high conduction state reduces the voltage across the others, preventing them from making the transition. Due to the negative resistance characteristic, only one diode at a time can traverse the negative resistance region. The selection of which diode makes the transition first is determined by minute random circuit variations.

These and other objects and features, the nature of the present invention and its various advantages, will be more readily understood upon consideration of the attached drawings and of the following detailed description of the drawings.

The drawings shows a detailed circuit diagram of the lockout selector in accordance with the present invention.

DETAILED DESCRIPTION

This application is one of several applications covering the complete remote telephone testing system described above. Reference is made to parent application Ser. No. 459,396, filed May 27, 1965, now U.S. Pat. No. 3,410,966, issued Nov. 12, 1968, of which the present application is a division, and to copending applications, Ser. Nos. 721,906 and 721,907, which are also divisional applications based on said parent application.

In particular, the present invention is directed to the lockout selector device used in the remote telephone testing system described generally in the parent application. To provide a detailed description of the present invention as it is embodied in the remote telephone testing system, the above cited U.S. Pat. No. 3,410,966 is incorporated in its entirety herein by reference and made a part of the instant application. Especially, FIGS. 6—9 of the drawings, and column 7, lines 13—75, columns 8 and 9, and column 10, lines 1—44 of U.S. Pat. No. 3,410,966 are descriptive of the lockout selector and associated devices.

I claim:

1. A selector circuit comprising a plurality of control circuits, an equal plurality of negative resistance devices having first and second terminals and having two stable regions of positive resistance separated by an unstable region of negative resistance, an equal plurality of series resistances each having first and second terminals, a load impedance having first and second terminals and comprising an inductive element in series with a resistive element, a source of operating voltage, a source of reference potential, means for connecting said first terminal of each of said negative resistance devices to said first terminal of said load impedance, means for connecting said second terminal of said load impedance to said source of operating voltage, means for connecting said second terminal of each of said negative resistance devices to said first terminal of a corresponding one of said series resistances, means for selectively connecting said second terminal of each of said series resistances to said source of reference potential, and a combination for selectively enabling one of said plurality of control circuits in response to the transition of a corresponding one of said devices from one of said stable regions to the other of said stable regions, said combination comprising a plurality of transistors, each of which is uniquely associated with a corresponding one of said series resistances, and means for connecting the emitter and base electrodes of each of said transistors across the corresponding one of said series resistances.

2. The selector circuit according to claim 1 wherein said negative resistance devices comprise PNPN semiconductor junction diodes.

3. A lockout selector circuit comprising a plurality of control circuits to be selected one at a time, a corresponding plurality of devices each having two regions of stable positive resistance separated by a region of unstable dynamic negative resistance, a corresponding plurality of series resistances, a source of potential, a common load impedance comprising an inductive element in series with a resistive element, primary means for connecting said source of potential in series with said common load impedance to form a series combination of source of potential and load impedance, a plurality of secondary connecting means, each connecting in series one of said devices, a corresponding one of said series resistances, and said series combination of source of potential and load impedance, means including a plurality of selector switches for selectively enabling said secondary connecting means, and a combination for selectively enabling one of said plurality of control circuits in response to the transition of a corresponding one of said devices from one of said stable regions to the other of said stable regions, said combination comprising a plurality of transistors, each of which is uniquely associated with a corresponding one of said series resistances, and means for connecting the emitter and base electrodes of each of said transistors across the corresponding one of said series resistances.

4. The lockout selector circuit according to claim 3 further including timing means, means responsive to the enablement of any one of said control circuits for triggering said timing means, and means responsive to a delayed output from said timing means for disabling said connecting means corresponding to the enabled one of said secondary control circuits.

5. The lockout selector circuit according to claim 3 wherein said devices each comprise a PNPN semiconductor junction diode.